(12) United States Patent
Heuver et al.

(10) Patent No.: US 9,594,090 B2
(45) Date of Patent: Mar. 14, 2017

(54) PRESS-FIT TONE WHEEL FOR A SPEED-SENSING APPARATUS

(71) Applicant: Ford Global Technologies, LLC, Dearborn, MI (US)

(72) Inventors: Bradley Ronald Heuver, South Lyon, MI (US); Brandon David Lint, Whitmore Lake, MI (US); Peter Schultz, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 14/683,530

(22) Filed: Apr. 10, 2015

(65) Prior Publication Data

US 2016/0299169 A1 Oct. 13, 2016

(51) Int. Cl.
*F16H 3/44* (2006.01)
*G01P 3/44* (2006.01)
*F16H 57/08* (2006.01)

(52) U.S. Cl.
CPC .............. *G01P 3/44* (2013.01); *F16H 3/44* (2013.01); *F16H 57/082* (2013.01)

(58) Field of Classification Search
CPC . G01P 3/44–3/4956; F16D 1/06–1/072; F16H 3/44
See application file for complete search history.

(56) References Cited

U.S. PATENT DOCUMENTS

| | | | |
|---|---|---|---|
| 5,121,998 A * | 6/1992 | Bhatia | F16C 19/386 384/448 |
| 5,166,611 A | 11/1992 | Kujawa, Jr. et al. | |
| 5,760,575 A | 6/1998 | Kumamoto et al. | |
| 5,842,947 A * | 12/1998 | Weilant | F16H 63/3003 475/207 |
| 6,066,065 A * | 5/2000 | Breen | F16H 3/54 192/12 R |
| 6,149,543 A * | 11/2000 | Breen | F16H 3/54 192/12 R |
| 6,498,475 B2 * | 12/2002 | Foster | G01P 3/488 29/894 |
| 7,466,941 B2 * | 12/2008 | Miyamura | G03G 15/757 399/167 |

(Continued)

FOREIGN PATENT DOCUMENTS

| | | |
|---|---|---|
| JP | 7243440 A | 9/1995 |
| KR | 100952780 B1 | 4/2010 |
| KR | 1020110072873 A | 6/2011 |

*Primary Examiner* — Ramya Burgess
*Assistant Examiner* — David Morris
(74) *Attorney, Agent, or Firm* — James Dottavio; Brooks Kushman P.C.

(57) ABSTRACT

A planetary gearset is provided in a transmission for a vehicle. The planetary gearset includes a carrier that rotates about the axis. Tone wheels can be used as part of a speed-sensing mechanism in which the tone wheel includes surface features on an outside surface, and a speed sensor senses the surface features as they rotate about the axis and past the speed sensor. The tone wheel is connected to the carrier via a press-fit or interference-fit. To do so, the tone wheel includes legs or flanges that extend inward from an inner surface of the tone wheel. The legs or flanges flex as the tone wheel is pressed onto the carrier. The legs or flanges securely attach the tone wheel to the carrier.

15 Claims, 3 Drawing Sheets

(56) References Cited

U.S. PATENT DOCUMENTS

| | | | | |
|---|---|---|---|---|
| 7,487,862 B2* | 2/2009 | Carlson | ............... | B60T 8/329 |
| | | | | 188/18 A |
| 8,015,708 B2* | 9/2011 | Song | ............... | G01P 3/488 |
| | | | | 29/893.33 |
| 2004/0082420 A1* | 4/2004 | Robinson | ............... | B60K 17/046 |
| | | | | 475/183 |
| 2004/0180747 A1* | 9/2004 | Weilant | ............... | B60K 23/0808 |
| | | | | 475/154 |
| 2013/0012350 A1* | 1/2013 | Ebner | ............... | B60K 7/0007 |
| | | | | 475/149 |

* cited by examiner

PRESS-FIT TONE WHEEL FOR A SPEED-SENSING APPARATUS

TECHNICAL FIELD

This disclosure generally relates to a tone wheel configured to interact with a speed sensor. More particularly, the tone wheel is for a planetary gearset and is configured to attach via an interference fit with a gear of the planetary gearset.

BACKGROUND

Modern vehicles include a plethora of electronic sensors that provide information to one or more controllers. One such sensor is a rotational speed sensor that detects the speed of a rotating component. A tone wheel can either be formed integrally with the rotating component or attached to it. The tone wheel includes slots, grooves, or other surface features. As the rotating component rotates, the surface features of the tone wheel also rotate and an electrical pulse is generated each time a surface feature rotates past the sensor.

Transmissions in vehicles have many rotating parts, and a speed of the rotating parts is helpful in many different control settings. One example of a mechanism in a transmission with rotating parts is a planetary gearset. Planetary gearsets include a sun gear, planet gears, a planet carrier, and a ring rear. Any one of these gears can be configured to rotate about the central axis. The detected rotating speed of one of these gears can typically make the rotational speeds of the other gears known through the given gear ratio of the planetary gear set. For example, a tone wheel may be provided about and secured to the carrier to make the speed of the carrier known; hence, the speed of the sun and planet gears also known.

SUMMARY

In one embodiment, a transmission includes a planetary gearset having a carrier. An annular-shaped tone wheel is connected to the carrier, and has an inner-diameter surface and an outer-diameter surface. The tone wheel further includes a pair of legs extending inward from the inner-diameter surface. An interference fit is provided between the legs and the carrier.

In another embodiment, a tone wheel for a transmission of a vehicle is provided. The tone wheel has a body having a convex outer surface, a concave inner surface, and a plurality of flanges. The outer surface has a plurality of surface features arranged annularly thereon about a central axis. The flanges extend inward from the inner surface toward the central axis. Each flange has a mating surface for contacting a carrier. The mating surface is axially offset from the inner surface of the body.

In yet another embodiment, a method of assembling a planetary gearset is provided. The method includes connecting a plurality of planet gears to a carrier, wherein the carrier has a plurality of surfaces each located between adjacent planet gears. The method also includes press-fitting a pair of legs of a tone wheel onto each surface to secure the tone wheel to the carrier.

DETAILED DESCRIPTION

Figure 1:
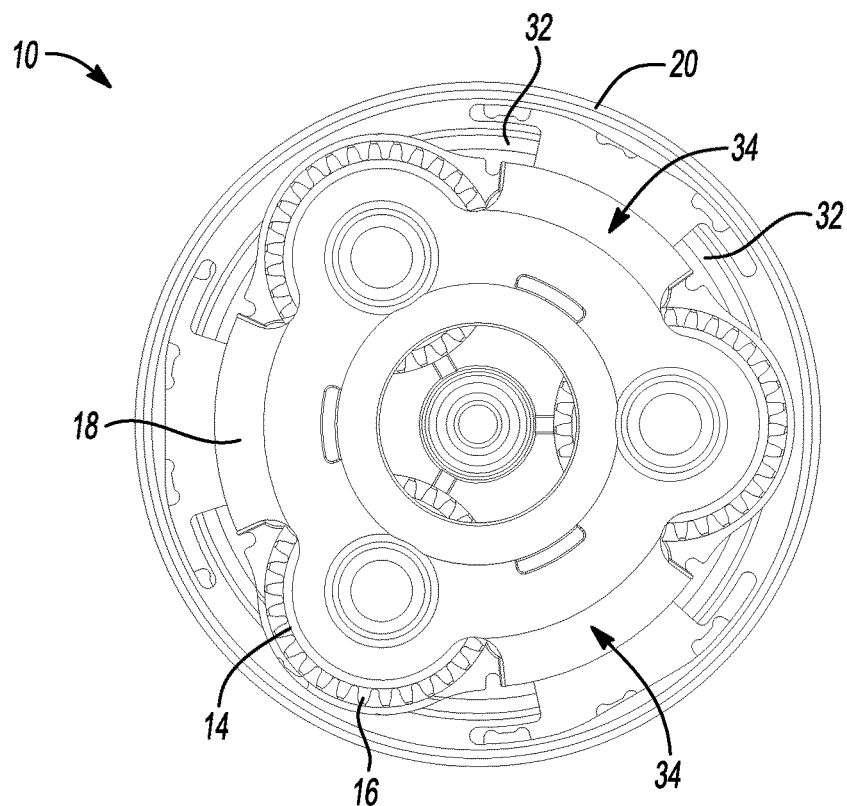
FIG. 1 is a front view of a planetary gearset with an attached tone wheel.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to 1-4, a planetary gear set 10 for a transmission of a vehicle is illustrated. The planetary gearset 10 includes a sun gear (not shown) that shares a central axis with that of the gearset 10. Radially outward from the sun gear are three planet gears 14. The planet gears 14 include meshing teeth 16 that correspond to teeth on the sun gear. As the sun gear rotates, each of the planet gears 14 rotates about its own respective axis.

A carrier 18 is driveably connected to each of the planet gears 14. The carrier 18 can transfer rotational movement to and from the planet gears 14 such that the planet gears 14 can rotate in unison about the sun gear. As the carrier 18 rotates about the central axis, the planet gears 14 rotate about the central axis and their own individual axis as well.

Figure 2:
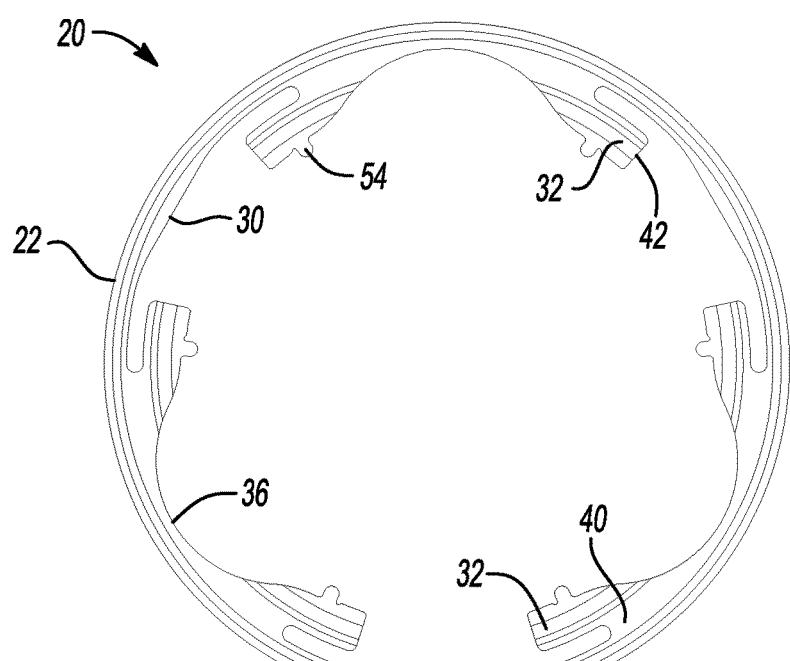
FIG. 2 is a front view of the tone wheel of FIG. 1 in isolation.
Figure 3:
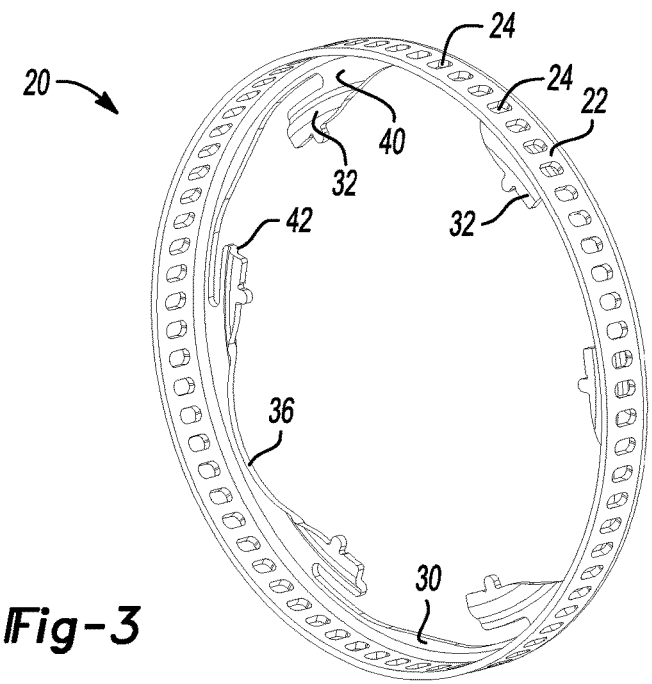
FIG. 3 is a perspective view of the tone wheel of FIG. 2.
Figure 4:
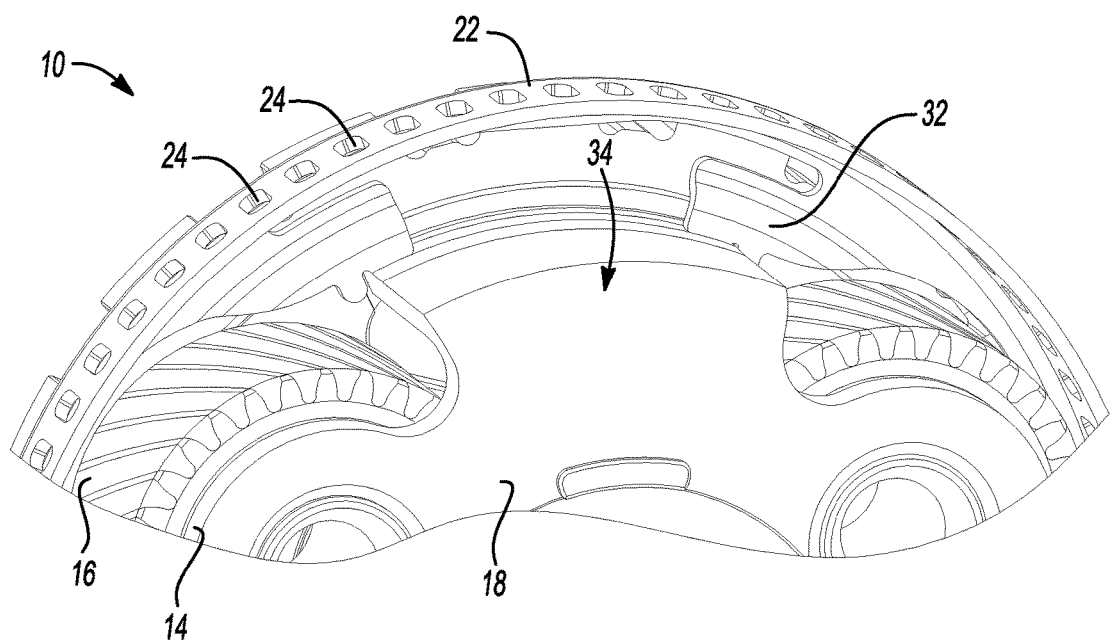
FIG. 4 is a perspective view of a portion of the planetary gearset, illustrating the interference fit between the tone wheel and a carrier of the planetary gearset.

A tone wheel is illustrated generally at 20, and shown in isolation in FIGS. 2 and 3. The tone wheel 20 couples to the planet carrier 18 to rotate with the carrier with the same rotational speed. Functioning as part of a rotational speed sensor, rotation of the tone wheel 20 is sensed to determine the rotational speed of the carrier 18 and thus the rotational speed of other components within the planetary gearset through known mathematical gear relationships.

The tone wheel 20 is generally round in shape and therefore includes a general diameter. The tone wheel 20 includes an outer-diameter surface 22. A continuous series of grooves, holes, undulations, or other such surface features 24 are stamped, formed, or otherwise provided on the outer-diameter surface. As will be described below with reference to FIG. 5, a pulse is created by a sensor when these surface features pass by the sensor. The speed or frequency of the pulse corresponds to the rotational speed of the tone wheel 20.

Utilizing a tone wheel 20 enables a vehicle controller to determine the rotational speed of the carrier and other portions of the planetary gearset 10. Accurate determination of the rotational speed of these components is useful for knowing the speeds going into and out of the planetary gear set.

During assembly of the planetary gearset 10, the tone wheel 20 must be installed onto the carrier 18 after the planet gears 14 and the carrier 18 are assembled together. Welding the tone wheel 20 to the carrier 18 can increase the risk of contamination getting into the planet gears and bearings of the planetary gearset 10. And, typical press-fit applications deform surfaces of the pressed part to assure a tight fit.

Precise location and clearance between the tone wheel 20 and the associated sensor is imperative for accurate speed readings.

According to the present disclosure, the tone wheel 20 of the planetary gearset 10 is provided with structure that enables it to be press-fit onto the carrier 18. This eliminates the need for the time, expense, and potential contaminants that come naturally with welding.

To accomplish the press-fit, the tone wheel 20 includes an inner-diameter surface 30 with a plurality of legs 32 extending therefrom. The legs 32 are relatively flexible in that they can flex relative to the inner- and outer-diameter surfaces 22, 30 of the tone wheel 20. This allows the legs 32 to be pressed onto the carrier 18 and deform to assure a secure press-fit without deforming the outer-diameter surface 22 on which the surface features 24 are provided. In other words, the legs 32 provide a surface to be press-fit onto an associated surface of the carrier 18 while maintaining the shape of the outer-diameter surface 22.

The legs 32 can come in pairs. As shown in FIG. 1, for example, the tone wheel 20 includes three pairs of legs 32, with each pair contacting one corresponding contact region 34 of the carrier 18. This embodiment is beneficial for a three-planet-gear gearset in which the carrier includes three regions that extend over and between two of the planet gears 14. As illustrated in FIG. 1, the contact regions 34 can be flanges that extend from an area axially-outward of the planets 14 toward and in-between the planets 14. The legs 32 can contact opposing sides of this contact region 34 of the carrier 18. Between two of the pairs of legs 32 are concave regions 36 of the inner-diameter surface 30. This provides clearance for the individual planet gears 14 to rotate.

The tone wheel 20 shown in the figures is but one embodiment in which the tone wheel 20 has three sets or pairs of legs 32 for each of three contact regions 34 of the carrier. This corresponds to the planetary gearset having three planet gears 14. However, it should be understood that more or less than three planet gears 14 can be provided, and as such, the carrier 18 can be designed to have more or less than three contact regions 34 that extend between a respective pair of planet gears 14. This can lead to a design of the tone wheel 20 having more or less than three pairs of legs 32. For example, the planetary gearset 10 may have five planet gears, and the tone wheel 20 can include five pairs of legs 32, with each pair of legs 32 contacting one respective contact region of the carrier.

To make an interference-fit or press-fit secure between the tone wheel 20 and the carrier 18, a mechanical press (not shown) may be utilized. The press can be hydraulically equipped or otherwise capable of providing a large press force to the tone wheel 20. The mechanical press can be operated to press the tone wheel 20 along the carrier 18 in the direction of the central axis of the planetary gearset 10. As the tone wheel 20 is pushed along the carrier, the legs 32 are the first and only part of the tone wheel 20 to contact the carrier 18. The legs 32 deform slightly outward from the central axis and provide resistance against the contact regions 34 of the carrier 18. When the press is finished pressing the tone wheel 20 onto the carrier 18, a secure interference fit is provided between the legs 32 and the contact region 34.

As the legs 32 come in pairs, each pair of legs 32 provide an interference fit with the carrier 18 at two separate locations. Each pair of legs provides two loading points per contact region 34 of the carrier 18. If three pairs of legs 32 are provided, as illustrated in the figures, then six different loading points are provided. With six different loading points, the mechanics of the deflection of forces with the interference fit is generally hexagonal in shape. If, in contrast, the tone wheel were to have single weld spots or the like to secure the tone wheel to the carrier, only three loading points would be provided and therefore the mechanics of deflection would be triangular in shape. Utilizing pairs of legs 32 to have additional loading points reduces the magnitude of deflection forces at each loading point by spreading the load to additional load points.

To further assist with a secure press-fit, the legs 32 are axially offset from the main portion of the tone wheel 20. In particular, the tone wheel 20 includes an interior body portion 40 that extends from the inner-diameter surface 30. This interior body portion 40 may extend about the entire inner-diameter surface 30, and also includes other regions such as the concave regions 36. The legs 32 extend from the interior body portion 40 and away from the inner-diameter surface and toward the central axis of the tone wheel 20. The legs 32 also extend in a direction along the central axis from the interior body portion 40 such that the legs 32 are axially offset from the main body portion 40. This provides the legs 32 with a contact surface 42 that is axially offset from the main body portion 40 for engaging with the contact region 34. Thus, the point of engagement between the carrier 18 and the tone wheel 20 can be axially offset from the interior body portion 40 and inner-diameter surface 30 of the tone wheel 20. Having an axially-offset location of contact allows the tone wheel to bend and yield during fitting in a non-functioning area.

Figure 5:
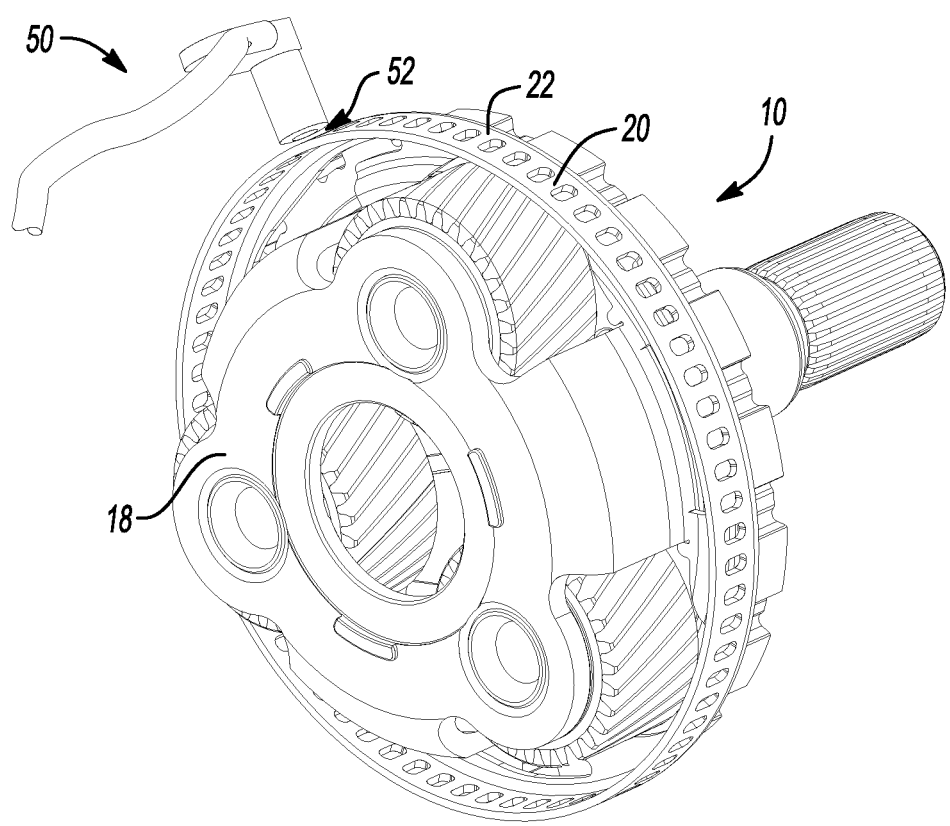
FIG. 5 is a perspective view of the planetary gearset and attached tone wheel, along with an accommodating sensor.

As explained above, the legs 32 provide a mechanism to allow an interference fit between the carrier 18 and the tone wheel 20 with minimal or no distortion of the outer-diameter surface 22 of the tone wheel itself during assembly. This enables the tone wheel 20 to maintain a critically-accurate and relatively small clearance between the tone wheel 20 and an accommodating speed sensor 50 at all locations along the outer-diameter surface 22. This is shown in FIG. 5. When the tone wheel 20 spins with rotation of the carrier 18, a pulse is generated by the sensor 50 when the surface features 24 pass by the sensor 50. The speed or frequency of the pulse corresponds to the rotational speed of the tone wheel 20. A gap or clearance 52 between the sensor 50 and these surface features 24 can be about 1 mm, and between 0.5 and 1.5 mm in preferred embodiments. Maintaining the size and consistency of this gap 52 as the tone wheel 20 spins is important for accuracy of speed readings. The legs 32 assure the outer-diameter surface 22 is not distorted during the process of fitting the tone wheel 20 to the carrier 18. This maintains the gap 52 at a preferable size.

To further a secure fit between the tone wheel 20 and the carrier 18, nubs 54 may extend away from each leg 32. The nubs can be arranged such that when the tone wheel 20 is fitted onto the carrier 18, each contact region 34 can be held within a pair of the nubs 54 on either end of the contact region. The nubs can also be used as locating features to quickly align the tone wheel 20 to the carrier prior to press-fitting.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission comprising:
   a planetary gearset having a carrier; and
   an annular-shaped tone wheel connected to the carrier and having an inner-diameter surface and an outer-diameter surface, the tone wheel further including a pair of legs extending inward from the inner-diameter surface;
   wherein an interference fit is provided between the legs and the carrier.

2. The transmission of claim 1, wherein the legs extend toward one another.

3. The transmission of claim 1, wherein the tone wheel includes a plurality of pairs of legs.

4. The transmission of claim 3, wherein the planetary gearset includes a plurality of planet gears, wherein the carrier includes a plurality of flanges each disposed between adjacent planet gears, and wherein each pair of legs provides the interference fit with one of the flanges.

5. The transmission of claim 1, wherein the carrier and the tone wheel define a common axis, and wherein the legs include a surface for contacting the carrier that is axially offset from the inner-diameter surface.

6. The transmission of claim 5, wherein the legs are flexible relative to a body of the tone wheel.

7. A tone wheel for a transmission of a vehicle, comprising:
   a body having
      a convex outer surface with a plurality of surface features arranged annularly thereon about a central axis,
      a concave inner surface, and
      a plurality of annular flanges extending inward from the inner surface toward the central axis, each flange having a mating surface for contacting a carrier, the mating surface being axially offset from the inner surface of the body.

8. The tone wheel of claim 7, wherein the body includes a number of pairs of the flanges, wherein the flanges of each pair extend toward one another.

9. The tone wheel of claim 7, wherein the annular flanges provide an interference fit with the carrier.

10. The tone wheel of claim 7, wherein the flanges are flexible relative to a body of the tone wheel such that the flanges provide an interference fit with a carrier of a planetary gearset the carrier.

11. The tone wheel of claim 7, wherein the transmission includes a plurality of planet gears, and wherein the body includes a plurality of concave portions each disposed between two of the plurality of flanges to respectively accommodate one of the planet gears.

12. A method of assembling a planetary gearset, comprising:
   connecting a plurality of planet gears to a carrier, the carrier having a plurality of surfaces each located between adjacent planet gears; and
   press-fitting a pair of legs of a tone wheel onto each surface to secure the tone wheel to the carrier.

13. The method of claim 12, wherein the step of press-fitting includes deflecting the legs radially-outward.

14. The method of claim 12, wherein the step of press-fitting includes sliding the tone wheel along a central axis of the carrier.

15. The method of claim 14, wherein the step of press-fitting further includes sliding a plurality of concave portions of the tone wheel axially over the planet gears.

* * * * *

UNITED STATES PATENT AND TRADEMARK OFFICE
CERTIFICATE OF CORRECTION

PATENT NO. : 9,594,090 B2
APPLICATION NO. : 14/683530
DATED : March 14, 2017
INVENTOR(S) : Bradley Ronald Heuver et al.

It is certified that error appears in the above-identified patent and that said Letters Patent is hereby corrected as shown below:

In the Claims

Column 6, Lines 11-12, Claim 10:
After "interference fit with"
Delete "a carrier of a planetary gearset".

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*